US006317449B1

United States Patent
Zanger et al.

(10) Patent No.: US 6,317,449 B1
(45) Date of Patent: Nov. 13, 2001

(54) METHOD AND DEVICE FOR RESONANCE ENHANCEMENT, IN PARTICULAR FOR TUNABLE FREQUENCY CONVERSION OF LASER RADIATION

(75) Inventors: Eckhard Zanger; Ralf Müller; Wolfgang Gries, all of Berlin (DE)

(73) Assignee: LAS Laser Analytical Systems, Inc. (DE)

( * ) Notice: Subject to any disclaimer, the term of this patent is extended or adjusted under 35 U.S.C. 154(b) by 0 days.

(21) Appl. No.: 09/276,166

(22) Filed: Mar. 25, 1999

(30) Foreign Application Priority Data

Mar. 25, 1998 (DE) ............................................... 198 14 199

(51) Int. Cl.[7] .................................................... H01S 3/08
(52) U.S. Cl. ........................ 372/100; 372/100; 372/98; 372/99; 372/94; 372/20; 372/28
(58) Field of Search ................................ 372/100, 99, 20, 372/28, 94, 32, 98; 359/328, 329

(56) References Cited

U.S. PATENT DOCUMENTS

| | | | |
|---|---|---|---|
| 4,731,787 | 3/1988 | Fan | 372/22 |
| 4,736,378 | * 4/1988 | Myslinski | 372/18 |
| 4,797,896 | 1/1989 | Kane | 372/94 |
| 5,007,065 | 4/1991 | Trutna | 372/94 |
| 5,027,361 | 6/1991 | Kozlovsky | 372/22 |
| 5,052,815 | 10/1991 | Nightingale | 372/94 |
| 5,227,911 | 7/1993 | Schiller | 359/222 |
| 5,289,491 | 2/1994 | Dixon | 372/92 |
| 5,357,532 | * 10/1994 | Aoshima et al. | 372/20 |
| 5,357,537 | 10/1994 | Maker | 372/94 |
| 5,761,236 | * 6/1998 | Kleinschmidt et al. | 372/100 |
| 5,799,032 | * 8/1998 | Hansson | 372/99 |

FOREIGN PATENT DOCUMENTS

| | | |
|---|---|---|
| 145588 | 12/1980 | (DE) . |
| 0452069 | 10/1991 | (EP) . |
| 1214941 | 12/1970 | (GB) . |

OTHER PUBLICATIONS

J.Jasny et al.; A Mirror–free Cavity Configuration for a CW Ring Dye Laser; Optics Communications, vol. 53, No. 1 Feb. 1, 1985; pp. 43–47.
M.Brieger et al.; Enhancement of Single Frequency SGH in a Passive Ring Resonator; Optics Communications, vol. 38, No. 5,6; p. 423.
C.Adams, et al; Tunable Narrow Linewidth Ultra–violet Light Generation by Frequency Doubling of a Ring Ti:sapphire Laser Using Lithium tri–borate in an External Enhancement Cavity; Opics Communications 90 (1992) pp. 89–94.
S. Bourzeix, et al.; Efficient Frequency Doubling of a COhtinuous Wave Titanium: sapphire Laser in an External Enhancement Cavity; Optics Communications 99 (1993) pp. 89–94.

* cited by examiner

*Primary Examiner*—Leon Scott, Jr.
*Assistant Examiner*—Delma R. Flores Ruiz
(74) *Attorney, Agent, or Firm*—Norris, McLaughlin & Marcus P.A.

(57) ABSTRACT

The invention pertains to a method and to a device for resonance enhancement, in particular for tunable frequency conversion of continuous laser radiation, in particular, with a resonator of mirrors and at least one refractive element. The purpose of the invention is to develop a method and a device of the described type, so that the frequency conversion of continuous laser radiation, in particular, will occur at high efficiency while avoiding the described disadvantages, and so that an improved tunability will be assured over the greatest possible wavelength range with regard to the incident wavelengths; this problem is solved in that a tuning of resonator length is performed by translation of at least one refractive element P. The resonator is formed from a first mirror M1, a second mirror M2, and of a refractive element P designed in trapezoidal shape, which performs the function of a prism.

23 Claims, 6 Drawing Sheets

METHOD AND DEVICE FOR RESONANCE ENHANCEMENT, IN PARTICULAR FOR TUNABLE FREQUENCY CONVERSION OF LASER RADIATION

BACKGROUND OF THE INVENTION

A number of methods and devices are already known which describe frequency conversion of continuous laser radiation by means of non-linear crystals, in particular the generation of the 2nd harmonic, with the goal of increasing the conversion efficiency.

The "classical apparatus" for frequency conversion of laser radiation, as is described in the publications by M. Brieger et al., "Enhancement of Single Frequency SHG in a Passive Ring Resonator", Opt. Commun. 38 (1981) p. 423; C. S. Adams et al. "Tunable narrow linewidth ultra-violet light generation . . . ", Opt. Commun. 90 (1992), p. 89; S. Bourzeix et al.: "Efficient frequency doubling of a continuous wave . . . ", Opt. Commun. 99 (1993), p.89, consists of a resonator in the shape of a double-Z, which is formed from four mirrors, of which at least two feature a radius of curvature, and one non-linear crystal. A first mirror is mounted to a piezo-element and is used for tuning the resonator length to resonate with the incident light wave. The portion of the incident wave reflected from a third mirror is recorded with a detector. Using standard methods (Hänsch-Couillaud, Pound-Drever), a control signal can be obtained from this for active resonator stabilization. The mirror spacings, radii of curvature, coatings and the crystal are configured so that:

a) The resonator is optically stable.

b) A beam waist forms between the two curved mirrors at the site of the non-linear crystal; the size of this waist is optimum for an efficient conversion.

c) The astigmatism of the second beam waist between another two mirrors (third and fourth mirrors) caused by the curved mirror, is compensated by the Brewster-cut crystal.

d) Three of the mirrors have the highest possible reflectivity for the fundamental wave.

e) One of the mirrors for the generated harmonic has the highest possible transmissivity.

f) The reflectivity of the incoupling mirror is sized so that the resonance enhancement of the fundamental wave is as great as possible, which is the case for impedance matching R=1−V(R: reflectivity, V: passive resonator losses).

g) The condition for phase matching is satisfied for the non-linear crystal.

With apparatus of this type, typically conversion efficiencies between 10% and 30% are attained. Since four adjustable mirror holders are needed in this configuration, the mechanical expense is relatively high. Since high-reflectivity mirrors always have a residual transmission, the passive losses from this array cannot be reduced indefinitely, so that the enhancement factor of the resonator will have an upper limit.

If the resonator tuning is performed in this array through translation of a mirror, then several disadvantages appear: The maximum permissible translation is limited by the increasing misalignment of the resonator caused by the changed beam path. An additional misalignment occurs due to the tilting occurring in standard piezoelements, which superposes the translational motion. Thus the resonator can follow a continuous variation of the incident light frequency only over a limited frequency interval (fast, continuous frequency tuning is required, e.g., for laser cooling of atoms).

Another disadvantage of the mirror translation occurs when the mirrors of the resonator have to be replaced for refitting to another wavelength range. In order to do this with a minimum expense, the mirror must be mounted using a replaceable mount to the piezoelement whose additional mass deteriorates the control dynamics for the resonator stabilization.

Usually angle-tuned crystals are used for tunable frequency conversion systems, since they will cover the largest wavelength range. When changing the wavelength of the incident radiation, the crystal must be turned in order to satisfy the condition for phase matching. During this rotation, the laser beam undergoes a parallel shift in the resonator, which necessitates a readjustment of the resonator. The beam position of the resultant harmonic is changed considerably during this readjustment. In applications that require a constant beam position, the position must be corrected again by using a downstream deflection system, such as a periscope made of two adjustable mirrors.

In other publications, for example, in U.S. Pat. No. 5,007,065, semi-monolithic apparatus is used, or as described in U.S. Pat. Nos. 5,027,361, 5,227,911, 4,731,787, 4,797,896, monolithic apparatus is used.

Compared to the discretely structured resonators, these apparatus have various advantages:

a) They are mechanically much more stable and thus have a lesser susceptibility to external interference.

b) They have reduced losses due to a smaller number of interfaces in the resonator.

c) Expensive, precision optical components can be omitted.

With these configurations, doubling efficiencies up to 80% are achieved. However, these configurations can only be tuned within very small wavelength intervals and thus their application is limited to fixed frequency lasers, such as diode-pumped Nd:YAG lasers. Subsequent adjustment or modification of this type of resonator is not possible. In case of partial damage, individual parts can only be replaced at considerable expense, if at all. In addition, the manufacture of the crystals that form the monolithic or semi-monolithic resonator is very complicated (spherically curved surfaces, special coatings, etc.). These crystals are not available on the market and can only be produced in special laboratories. Sometimes these configurations also make use of properties of crystals that are provided only by a few materials, such as a high coefficient for the electro-optical effect in the crystalline material lithium niobate, which is used for tuning the resonator with an electrical voltage. The limitation to such crystals then leads to a severe restriction in the wavelength range that can be doubled by them.

In U.S. Pat. Nos. 5,052,815 and 5,357,537 diode-pumped ring lasers are described whose resonators consist of only two mirrors and one or more refractive elements. They use the flexibility of a discrete structure that allows the adjusting of individual elements or modification by installation of additional optical elements even after the assembly. The resonator losses are reduced by the use of the smaller number of elements, in comparison to classical ring lasers. These advantages are used to create ring lasers with better efficiency and easier manufacture. All of these configurations contain an active laser medium and are used explicitly as laser apparatus.

In another known apparatus (M. Watanabe et al.: "Continuous-wave sum frequency generation near 194 nm .

..,", Opt. Commun. 97 (1993), p. 225), a prism is used for simultaneous, resonant enhancement of two different wavelengths. In this case, the dispersing effect of prisms is used to combine two laser beams of differing wavelength. The two laser beams are amplified in two independent resonators that have a non-linear crystal in their common branch which produces a sum-frequency from the two laser beams.

In the DD 145 588 methods for the shortening or the selection of pulses from $CO_2$— lasers are described, where the incoming laser pulse is divided into a switching and a switched beam by using a beamsplitter. The switching beam is focused into a unit for the generation of the 2. harmonic of the fundamental wave via a bending mirror and a lens. Then the 2. harmonic is guided to a switching crystal, which is antireflection coated for the 2. harmonic and for the fundamental wave. The switched beam is being delayed and directed to a lens with short focal length, thereby focusing it into the focus volume of the switching beam. In this pulse shortening arrangement the length of a beam path is changed by translation of a retro-reflecting prism, without changing the beam path outside the arrangement. By adding some suitable mirrors a resonator can be formed, which can be tuned by translation of the retro-reflecting prism. But the retro-reflecting prism doesn't allow high conversion efficiencies, because additional interfaces have to be introduced into the resonator, causing losses and decreasing the efficiency. The deflection angle of 180° will also decrease the efficiency, because this causes large incidence angles at the resonator mirrors, which have to be curved mirror to form an optical stable resonator. Large incidence angles will cause severe astigmatism, which reduces the efficiency.

In the Journal "Optics Communications", Vol. 53, No. 1, 1985, p. 43–47 a mirrorless configuration for a cw ring dye laser is described, which uses a special prism to form the resonator.

With the described focussing prism and with Littrow prisms an optically stable, astigmatically compensated and tunable resonator can be formed, but due to the large number of interfaces in the resonator frequency conversion with high efficiency or resonance enhancement with usable enhancement factor is not possible with this arrangement.

The purpose of the invention is to develop a method and a device of the described type, so that the frequency conversion of continuous laser radiation, in particular, will occur at high efficiency while avoiding the described disadvantages, and so that an improved tunability will be assured over the greatest possible wavelength range with regard to the incident wavelengths. The improvement in tunability is intended, in particular, to:

SUMMARY OF THE INVENTION

Enlarge the continuous tuning range,

Simplify the process of adjustment of components, and

Reduce the number of replaceable components and simplify their actual replacement.

The following distinction is made between several cases with regard to tuning of the incident wavelengths:

Case 1: The incident wavelength is continuously changed by such small amounts that the phase matching for the crystal is retained, i.e., only the resonator length need be adjusted, whereas the crystal need not be rotated. In this case, the changes in wavelength are typically less than 1 nm.

Case 2: The incident wavelength is changed by amounts that necessitate an adjustment of the crystal or of other components, but not a replacement of optical components. We are dealing here with changes on the order of 50 mn.

Case 3: The incident wavelength is changed by amounts that necessitate a replacement of components (mirror, crystal). In this case we are dealing with changes that are greater than 50 nm and can be as great as 1000 nm.

The desired improvement in tunability of this kind of frequency conversion system pertains to all three cases. In case 1, the continuous tuning range is to be increased, i.e.; at any time the resonator hat to be resonant with the continuously changing wavelength of the laser beam, mode-hops of the resonator being not allowed. In case 2, the process of adjusting of components is to be simplified, and the potential created for automated (motor-driven) tuning. In case 3, the number of replaceable components is to be reduced and the practical replacement steps are to be simplified as much as possible.

The solution to this problem is indicated in the properties of claims 1 and 7. Useful design embodiments are stated in the subclaims.

The application of the invention will provide the following particular advantages over the prior art devices:

1. Compared to the classical 4-mirror design, the resonator consists of fewer elements, so that the passive losses are reduced and the conversion efficiency is increased.
2. Compared to the classical 4-mirror design, a far more compact design can be created.
3. Due to the more compact design, the resonator is less sensitive to external interference.
4. Cost savings: Only 2 precision mirror holders are needed, in comparison to 4 in the classical resonator.
5. Due to the smaller resonator length compared to the classical design, the free spectral range of the resonator is far greater and thus the acceptance width of the resonator is increased (with constant resonator quality) with regard to the frequency bandwidth of the incident radiation. Therefore, laser beam sources of poorer quality can be converted with this apparatus.
6. Compared to monolithic and semi-monolithic apparatus: Only elements are used that are readily available on the market at low cost (planar and uncoated surfaces for prism and crystal, mirrors using standard substrate sizes and standard coatings).
7. The tuning of resonator length by translation of the prism makes tuning possible over a greater frequency range than for translation by a mirror.
8. The compensation of beam shift by opposite rotation of the prism enlarges the wavelength range that can be covered without realignment of the resonator.
9. When tuning by means of component replacement, that is when resonator optics are exchanged to move to another continuous tuning range, only two mirrors and the crystal have to be replaced. The mounts can be optimized for this purpose, without having to accept any disadvantages, such as a deterioration in control dynamics.

BRIEF DESCRIPTION OF THE DRAWINGS

The invention will be described in greater detail below based on several design examples of resonator apparatus. The associated figures show:

FIG. 4 A schematic representation of a first design embodiment according to this invention FIG. 5 A diagram to illustrate the vertical beam shift in a prism length of 10 mm FIG. 6 A diagram to illustrate the vertical deflection angle due to rotation of the prism FIG. 7 A diagram to illustrate the horizontal deflection angle due to rotation of the prism FIG. 8 A schematic illustration of the apparatus with precise compensation, and distinction between several cases with regard to tuning of the incident wavelengths has been stated before.

DESCRIPTION OF THE PREFERRED EMBODIMENTS

Figure 2:
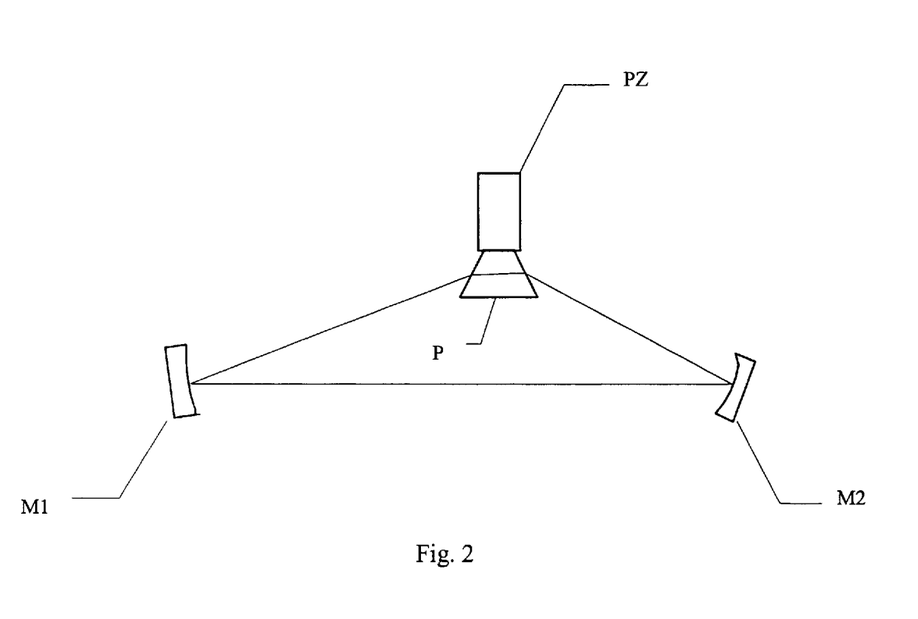
FIG. 2 The schematic representation of a basic design

According to the representation in FIG. 2, the basic resonator is formed from mirrors M1 and M2 and a refractive element P.

The refractive element P has the function of a prism, but is designed in a trapezoidal shape (but hereinafter called a prism for simplicity) for easier installation and due to the smaller mass. Since none of the mirrors M1, M2 is used for resonator tuning, both can be designed in readily available, standard sizes without regard to their mass inertia. The mirror holders can be optimized with regard to simple replacement of mirrors M1, M2.

The prism of highly transparent material, e.g. fused silica, is not given any coating. The angle of the refractive surfaces to each other is selected so that the input and output of the beam occurs at the Brewster angle or near the Brewster angle. In the case of fused silica, reflection losses of less than 0.01% are obtained for a peak angle of 69° in the wavelength range of 400 nm to 1000 nm. The prism is attached without a mount directly to a piezo element PZ, since replacement of the prism is not necessary after a change of the wavelength range. In order to keep the moving mass as small as possible, the attachment of the prism takes place preferably by use of adhesive.

Figure 3:
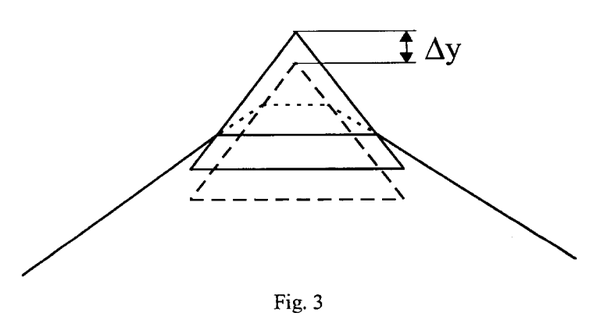
FIG. 3 A schematic representation of the beam path in the prism

As is indicated in FIG. 3, the beam path in the resonator does not change when the prism is translated in the direction of its axis of symmetry. The optical path length is decisive for the resonator tuning. If the prism is moved by an amount $\Delta y$ in the direction of its symmetry axis, then the optical path length will change by:

$$\Delta L = 2\Delta y(n \sin 2\alpha - 1) \approx 0.7 \Delta y.$$

(n: refractive index of the prism, $\Delta$: angle of incidence)

Due to the symmetrical beam path in the prism, the minimum deflection is present here. Thus, the tilting of the prism affects the beam path in the resonator only very little. These two properties of the apparatus make possible a much greater tuning range in case 1, since larger translation paths can be used without de-adjusting the resonator.

Figure 1:
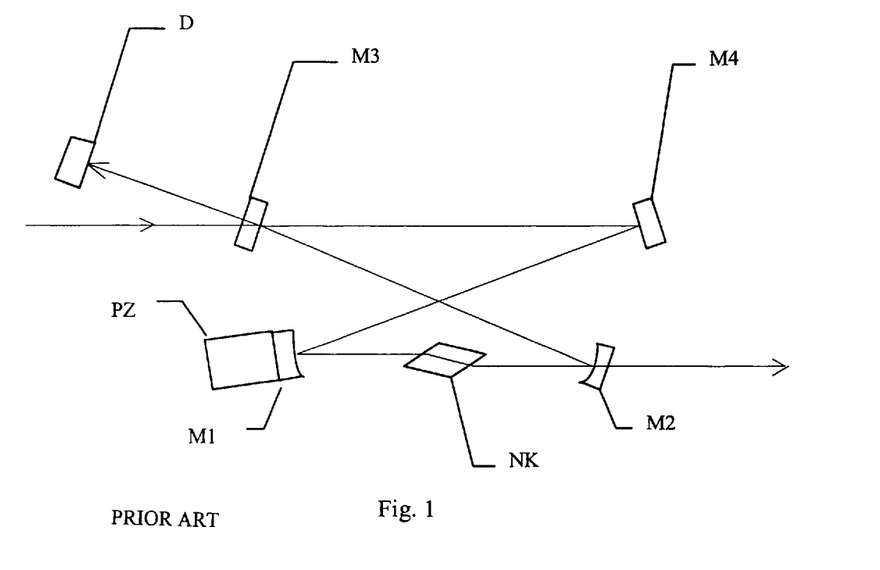
FIG. 1 A schematic representation of the "classical apparatus" of the prior art.
Figure 4:
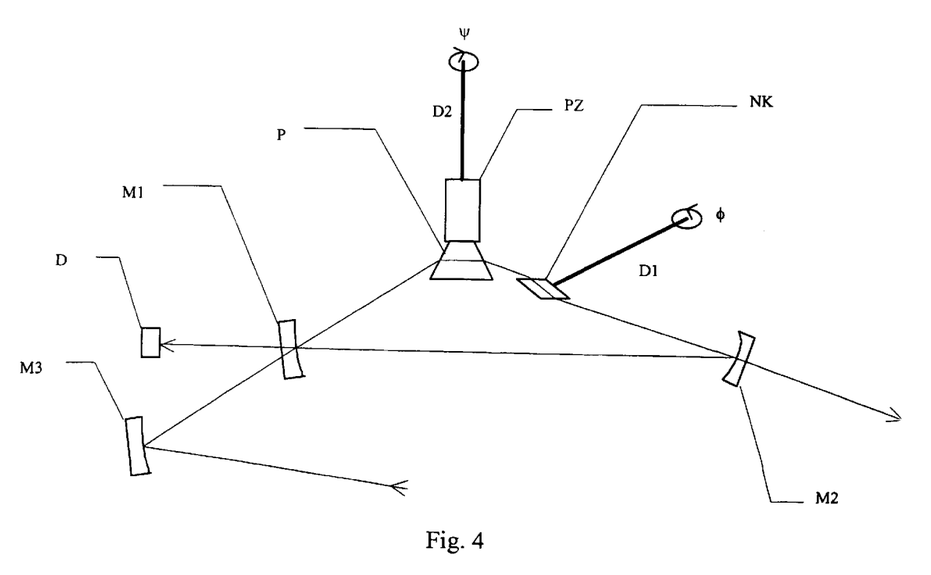
Figure 5:
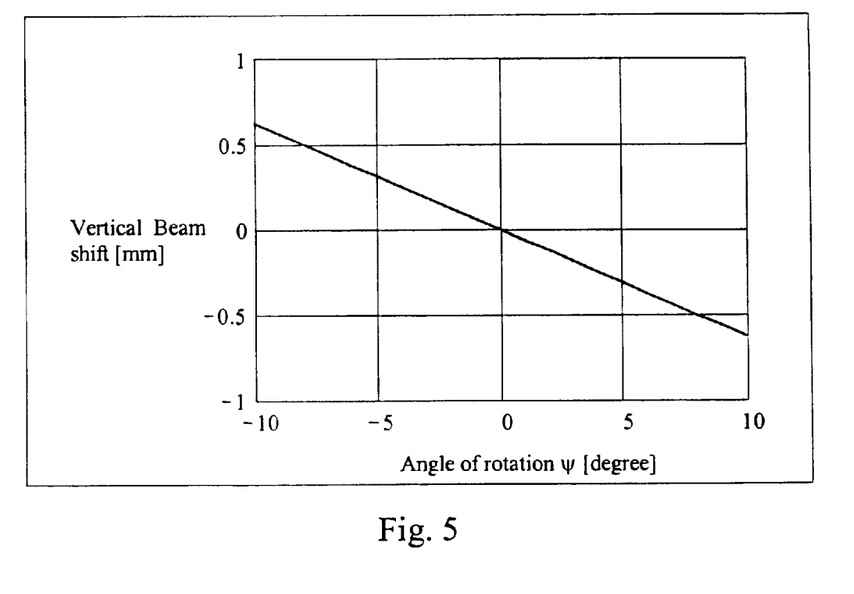
Figure 6:
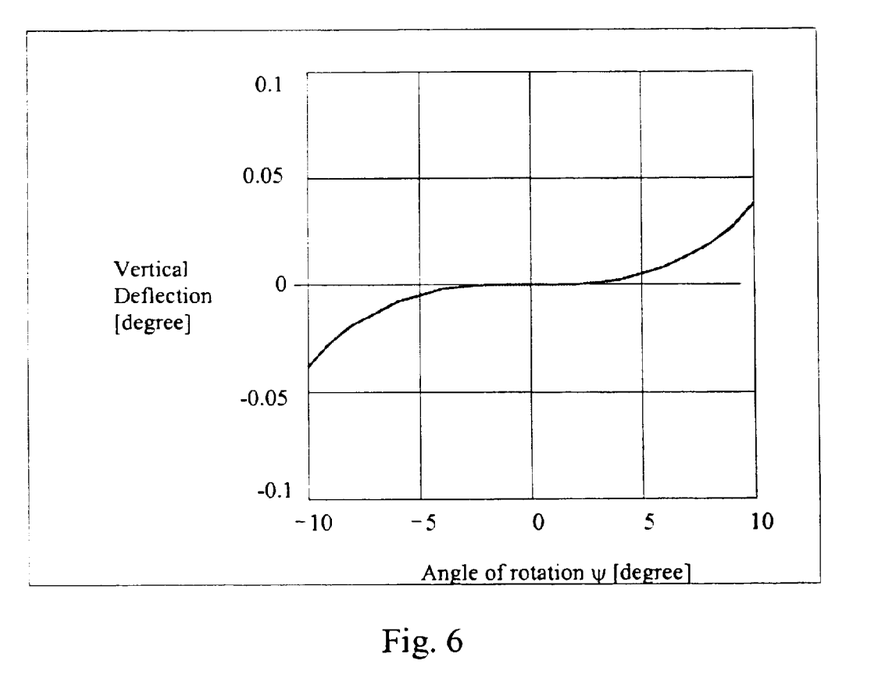
Figure 7:
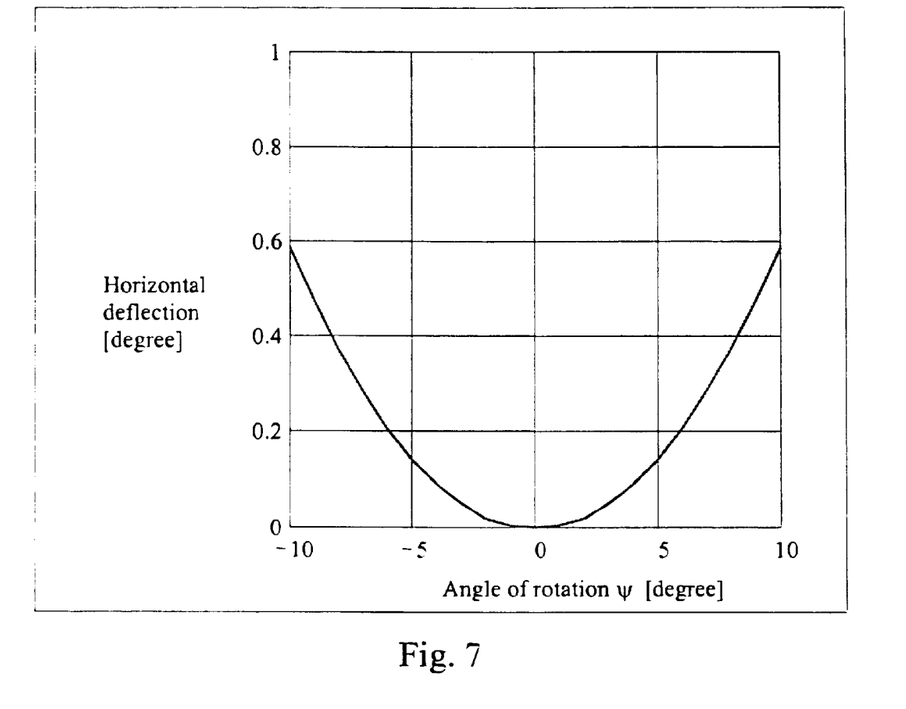
Figure 9:
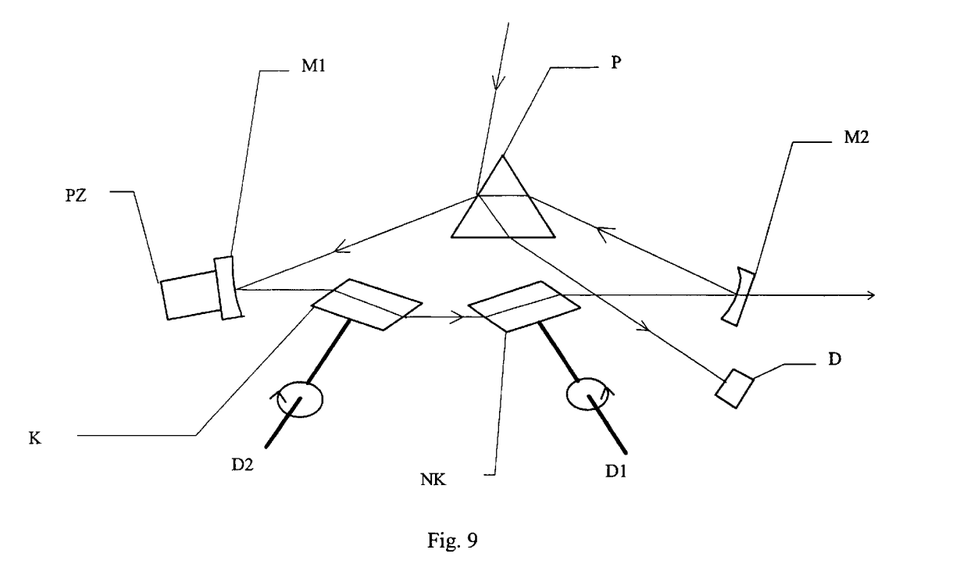

In the preferred design example according to FIG. 4, the mirror M1 is used as a coupling mirror In FIGS. 1, 4 and 9, the letter D designates a detector. The reflectively at the fundamental wavelength is selected so that impedance matching R=1−V, V; passive losses) is present. The mirror M2 is used as a outcouplin mirror and is thus highly reflective at the fundamental wavelength, and is of highly transmissive design at the wavelength of the created harmonic. The frequency conversion is performed with a Brewster-cut, angular-tuned, non-linear crystal NK, which is located between the prism P and the outcoupling mirror M2. For angular turning, the crystal is rotated about an axis D1 which is located at the ring plane and is positioned perpendicular to the beam path within the crystal. The produced beam shift upon rotation of the crystal can be compensated at small angles, by an opposing rotation of the prism. Then the prism will be rotated about its axis of symmetry D2. Since the minimum deflection is present in the selected beam path, a rotation of the prism quite approximately causes merely a beam shift, but no deflection of direction. The results of numeric calculations of the beam shift and the deflection angle caused by the rotation of the prism, are presented graphically in FIGS. 5, 6 and 7. To achieve compensation, the angle of rotation $\psi$ for the prism must satisfy the relation $$\psi = \frac{d_k n_p (n_k - 1)}{d_p n_k (n_p - 1)} \cdot \phi$$

where $\phi$ is the angle of rotation of the crystal, $n_k$ and $n_p$ are the refractive indices of the crystal or prism, $d_k$ and $d_p$ are the path lengths in the crystal or in the prism, respectively. A simple mechanical coupling of the crystal rotation with the prism rotation according to the stated relation thus allows an angular tug of the crystal without simultaneously de-adjusting the resonator. Since the prism rotation causes a secondary or minor beam deflection, then this is only possible for a limited range of angles. However, in the apparatus described below with an additional compensator element, precise compensation can be attained, but it must be purchased at the expense of increased resonator losses.

The resonator device in FIG. 4 contains four elements that produce astigmatic distortions: The curved mirrors M1 and M2, the prism P and also the non-linear crystal NK. The astigmatisms produced by the mirrors differ in sign from those of the prism and the crystal. These opposing signs are used in the classical apparatus according to FIG. 1 in order to compensate for the astigmatism of that beam waist of the resonator on which the coupled beam would be ideally imaged under mode-matching conditions. It is necessary to inject the entire power of a laser beam with diffraction-limited, round Gaussian profile (TEM$_{00}$ mode) into the fundamental mode of the resonator. In the case of the resonator described herein, a complete compensation of the astigmatism is not possible due to the reduced number of degrees of freedom. Therefore, the compensation of the astigmatism takes place partly outside of the resonator by means of a spherically curved mirror M3 (see FIG. 4). This signifies no greater expense than otherwise, since for a precise imaging of the injected laser beam, an adjustable deflection system will also be needed, such as a periscope consisting of two mirrors. Instead of the planar mirror normally used, in this case one of the periscope mirrors is designed as a concave mirror.

Basically, a cubic cut, non-linear crystal can be used under perpendicular light incidence in the described apparatus; the crystal's input and output surfaces are provided with corresponding anti-reflection coatings. In this case, somewhat greater conversion efficiencies are possible, since the losses in the produced harmonics at the output side of the crystal are smaller. Whether this will produce an increase in efficiency is highly dependent on the quality of the used anti-reflection layers. In addition, increased costs will be incurred to acquire the required anti-reflection coatings.

Figure 8:
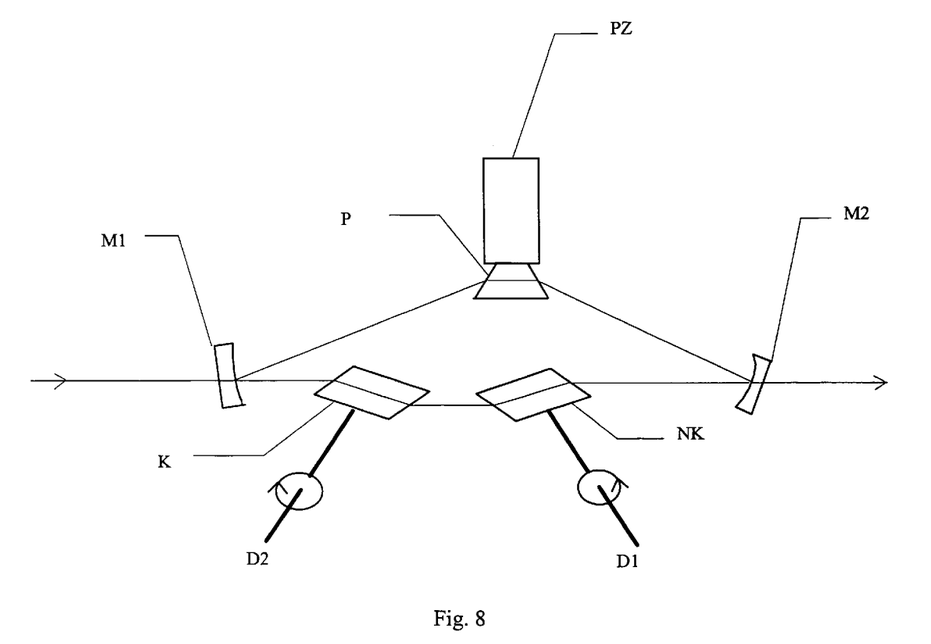

In an additional design embodiment according to FIG. 8, an additional plane-parallel plate K of highly transparent material (preferably fused silica) is placed at the Brewster angle in the beam path. The beam shift by the non-linear crystal NK is compensated in this apparatus by opposing rotation of the plane-parallel plate, whereas the deflection prism P is not moved. Otherwise, the apparatus corresponds to that in FIG. 4. Since the plane-parallel plate K, like the non-linear crystal NK, causes no angular deflection of the beam of any kind upon rotation about the axis D2 or D1, the beam shift of the crystal will be precisely compensated at a suitable rotational angle and direction. The useful wavelength range when tuning per case 2 (see above) is thus limited only by the increased losses caused by deviation from the Brewster angle. The enlargement of the tuning range in case 2, with respect to the apparatus in FIG. 4, has the disadvantage of somewhat greater losses which are caused by the additional element. As in the previously described apparatus, a cubic cut crystal with anti-reflection coating can also be used here, to reduce the outcoupling losses of the produced harmonic. In this case it is recommended to use the compensator plate also under perpendicular incidence and with anti-reflection coatings, in order to ensure a precision compensation. Another possible variant is compensation by a second crystal positioned symmetrically. This arrangement has the advantage that the efficiency-reducing walk-off angle of the crystal will likewise be compensated.

In the design embodiment according to FIG. 9, the fundamental beam is not injected via the mirror M1, but rather via one of the (uncoated) prism surfaces. In contrast to the configurations in FIGS. 4 and 8, the peak angle of the prism is selected so that the angle of incidence on the incoupling surface of the prism is smaller than the Brewster angle and the angle of incidence at the other prism surface is equal to the Brewster angle. The precise value for the peak angle is determined from the condition for impedance matching: The reflectivity R of the incoupling surface defined by the Fresnell relationships for the incoupling beam should correspond to the passive losses V of the resonator (R=V). If we use a commercially available, equal-side prism of quartz (peak angle 60°), then we obtain a reflectivity of about 1.3%. This roughly corresponds to the value for the passive losses, which are usually attained by these resonators. By using uncoated, standard prisms, the incoupling element can be produced in an exceptionally low-cost manner. In addition, this incoupling element is nearly achromatic, since the reflectivity changes very little across large ranges of wavelength. Since the useful wavelength range of a set of mirrors is determined essentially by the partially reflecting incoupling layer whose wavelength range is fundamentally smaller than for high reflectivity layers, with the apparatus described here, the useful wavelength range of a set of mirrors can be increased. The resonator tuning occurs preferably through translation of the mirror M1, since its simultaneous use as incoupling element and as a tuning element causes space problems. In addition, the advantages of the prism translation are no longer fully displayed here. Otherwise, this apparatus corresponds to that of FIG. 8. The disadvantage in the apparatus according to FIG. 9 compared to the apparatus in FIG. 8 is its more difficult adjustment. In this case, the prism must be held in an adjustable mount, since it affects both the beam path in the resonator and also the beam position of the injected beam. An iteration-free and independent adjusting of the injected beam and resonator, like that used in the apparatus in FIGS. 4 and 8, is not possible in this apparatus.

Of course, the precise shape of crystal and compensator can be varied just as in the apparatus previously described (cubic crystal, two crystals).

The invention is not limited to the formats described here. Rather, it is possible to create additional design examples through combination of the properties, without leaving the framework of the invention.

"Method and Device for Resonance Enhancement, in particular for tunable Frequency Conversion of Laser Radiation"
Reference List

| | |
|---|---|
| D1 | Axis |
| D2 | Axis |
| K | Plate |
| M1 | Mirror |
| M2 | Mirror |
| M3 | Mirror |
| NK | Non-linear crystal |
| P | Refractive element |

What is claimed is:

1. Method for resonance enhancement for tunable frequency conversion of continuous laser radiation beam with a ring resonator made of mirrors and at least one refractive element wherein tuning of resonator length is performed by translation of at least one merely refractive element, wherein the frequency conversion is performed with an angle-tuned, non-linear crystal which is located between the refractive element and a outcoupling mirror and which is rotated about an axis for phase adjustment, said axis being located in the ring plane and having a perpendicular component to the beam path within the crystal and the beam shift of which is compensated by a rotation of the refractive element about its symmetry axis opposite the rotation of the crystal.

2. Method for resonance enhancement for tunable frequency conversion of continuous laser radiation beam with a ring resonator made of mirrors and at least one refractive element wherein tuning of resonator length is performed by translation of at least one merely refractive element, wherein an additional plane-parallel plate of highly transparent material is located at the Brewster angle in the beam path and that the beam shift caused by the non-linear crystal is compensated through opposite rotation of the plate about an axis that is located in the ring plane, and the refractive element is not moved.

3. Device for resonance enhancement, in particular for tunable frequency conversion of continuous laser radiation beam, in particular, by use of mirrors and at least one refractive element, wherein the resonator is formed from a first mirror, a second mirror and of a merely refractive element designed in trapezoid shape, which performs the function of a prism and wherein the first mirror is coated as an incoupling mirror and the second mirror is coated as outcoupling mirror, and that there is a Brewster-cut, angle-tuned, non-linear crystal located between the refracting element and the outcoupling mirror.

4. Device for resonance enhancement, in particular for tunable frequency conversion of continuous laser radiation beam, in particular, by use of mirrors and at least one refractive element, wherein the resonator is formed from a first mirror, a second mirror and of a merely refractive element designed in trapezoid shape, which performs the function of a prism and wherein a cubic faceted, non-linear crystal is located between the refracting element and the second mirror and is set up at a perpendicular light incidence, and the crystal's input and output surfaces are provided with anti-reflection coatings.

5. Device for resonance enhancement, in particular for tunable frequency conversion of continuous laser radiation beam, in particular, by use of mirrors and at least one refractive element, wherein the resonator is formed from a first mirror, a second mirror and of a merely refractive element designed in trapezoid shape, which performs the function of a prism and wherein a plane-parallel plate of highly transparent material is placed at the Brewster angle in the beam path.

6. Device according to claim 5 wherein the plane-parallel plate is positioned under perpendicular light incidence and is equipped with anti-reflection coatings.

7. Device for resonance enhancement, in particular for tunable frequency conversion of continuous laser radiation beam, in particular, by use of mirrors and at least one refractive element, wherein the resonator is formed from a first mirror, a second mirror and of a merely refractive element designed in trapezoid shape, which performs the function of a prism and wherein there are first and second non-linear crystals in the beam path and the second crystal is positioned symmetrical to the first crystal.

8. Device for resonance enhancement, in particular for tunable frequency conversion of continuous laser radiation beam, in particular, by use of mirrors and at least one refractive element, wherein the resonator is formed from a first mirror, a second mirror and of a merely refractive element designed in trapezoid shape, which performs the function of a prism and wherein the refractive element has an incoupling surface and another surface, wherein the laser radiation is directed at the incoupling surface, wherein the peak angle of the refractive element is selected so that the angle of incidence to the incoupling surface is less than the Brewster angle and the angle of incidence to the other surface is equal to the Brewster angle, and wherein the first mirror is coupled to a piezo element for translating the first mirror for tuning the resonator.

9. Device for resonance enhancement, in particular for tunable frequency conversion of continuous laser radiation beam, in particular, by use of mirrors and at least one refractive element, wherein the resonator is formed from a first mirror, a second mirror and of a merely refractive element designed in trapezoid shape, which performs the function of a prism and wherein there are a plane-parallel plate of highly transparent material and a non-linear crystal in the beam path and wherein the refractive element, the plane-parallel plate and the non-linear crystal are rotatably mounted.

10. Method for resonance enhancement in a ring resonator comprising a pair of mirrors and at least one refractive element in which laser radiation follows a path between the mirrors and the refractive element, the path having a portion within the refractive element, said method comprising:

providing a refractive element in which the portion of the path within the refractive element extends in a first direction and is variable in length by translation of the refractive element in a second direction perpendicular to the first direction; and translating the refractive element in the second direction to change the length of the path and tuning of the resonator.

11. Method according to claim 10 wherein the refractive element is a prism.

12. Method according to claim 11 wherein the prism is trapezoidal in cross-section with a first side which is disposed substantially parallel to the portion of the path, with a second side spaced from and substantially parallel to the first side but shorter than the first side and a pair of refractive sides extending between the ends of the first side and the ends of the second side.

13. Method according to claim 12 wherein the refractive sides define the refractive surfaces of the prism and wherein the angle of the refractive sides to each other is selected and the laser radiation is directed onto a refractive surface so that the path of the radiation at the refractive surfaces is near the Brewster angle.

14. Method according to claim 10 wherein one of the mirrors is an outcoupling mirror and the refractive element has an axis of symmetry and wherein the method further comprises:

providing an angle-tuned, non-linear crystal between the refractive element and the outcoupling mirror and in the path of the laser radiation;

adjusting phase of the radiation by rotation of the outcoupling mirror; and compensating for beam shift caused by the non-linear crystal by rotation of the refractive element around its axis of symmetry.

15. Method for resonance enhancement in a ring resonator comprising a pair of mirrors and at least one refractive element in which laser radiation follows a path between the mirrors and the refractive element, the path having a portion within the refractive element, said method comprising:

providing a refractive element with an uncoated surface;

directing fundamental wave laser radiation on the uncoated surface so that it is directed along said path; and tuning the resonator by translating one of the mirrors.

16. Device for resonance enhancement in a ring resonator, the resonator comprising a pair of mirrors and at least one refractive element arranged to direct laser radiation along a ring path extending between the mirrors and between the mirrors and the refractive element with a portion of the path within the refractive element and extending in a first direction, said refractive element being translatable in a second direction perpendicular to the first direction to provide a variation in the length of the portion of the path for tuning the resonator.

17. Device according to claim 16 wherein the refractive element is a prism of trapezoidal shape.

18. Device according to claim 16 further comprising translating means coupled to the refractive element for translating the refractive element in the second direction.

19. Device according to claim 18 wherein the translating means is a piezo element attached to the refractive element.

20. Device according to claim 16 for conversion of laser radiation at a fundamental wavelength to a different wavelength and wherein one of the mirrors is an incoupling mirror and the other of the mirrors is an outcoupling mirror and wherein the radii of curvature of the mirrors and the spacing of the mirrors and refractive element are selected so that the formed resonator is optically stable, wherein the reflectivity of the incoupling mirror is sized so that impedance matching occurs and wherein the outcoupling mirror is highly reflecting at the fundamental wavelength and is transparent at the different wavelength.

21. Device according to claim 16 wherein the refractive element is a highly transparent material without a coating and has a pair of refractive surfaces between which the portion of the path extends and wherein the angle of the refractive surfaces with respect to each other is selected so that the angles of the path of the radiation as it enters and leaves the refractive element are near the Brewster angle.

22. Device according to claim 16 wherein one of the mirrors is coated as an incoupling mirror, the other of the mirrors is coated as an outcoupling mirror and further comprising a Brewster-cut, angle-tuned, non-linear crystal located between the refracting element and the outcoupling mirror and to compensate for astigmatism, a spherically curved mirror is located outside of the resonator.

23. Device according to claim 22 wherein the spherically curved mirror is formed from a periscope mirror of a deflection system designed as a concave mirror.

* * * * *